US010095418B1

(12) United States Patent
Gong et al.

(10) Patent No.: US 10,095,418 B1
(45) **Date of Patent: *Oct. 9, 2018**

(54) AUTOMATIC TIERING OF STORAGE USING DYNAMIC GROUPING

(71) Applicant: International Business Machines Corporation, Armonk, NY (US)

(72) Inventors: Yongjie Gong, Shanghai (CN); Shuang Shuang Li, Hubei (CN); Yang Liu, Shanghai (CN); Mei Mei, Shanghai (CN); Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,767

(22) Filed: Dec. 19, 2017

Related U.S. Application Data

(63) Continuation of application No. 15/499,022, filed on Apr. 27, 2017.

(51) Int. Cl.
*G06F 3/06* (2006.01)

(52) U.S. Cl.
CPC ............ *G06F 3/061* (2013.01); *G06F 3/0619* (2013.01); *G06F 3/0647* (2013.01); *G06F 3/0665* (2013.01); *G06F 3/0689* (2013.01)

(58) Field of Classification Search
CPC ...... G06F 3/061; G06F 3/0647; G06F 3/0665; G06F 3/0619; G06F 3/0689
See application file for complete search history.

(56) References Cited

U.S. PATENT DOCUMENTS

| | | | |
|---|---|---|---|
| 8,380,947 | B2 | 2/2013 | Chiu et al. |
| 8,762,583 | B1 | 6/2014 | Faibish et al. |
| 8,782,324 | B1 | 7/2014 | Chen et al. |
| 9,274,941 | B1 | 3/2016 | Throop et al. |
| 9,753,987 | B1 | 9/2017 | Dolan et al. |
| 2014/0324920 | A1 | 10/2014 | Hamilton et al. |
| 2015/0286419 | A1 | 10/2015 | Guo et al. |

(Continued)

OTHER PUBLICATIONS

Zhang et al., "Adaptive Data Migration in Multi-tiered Storage Based Cloud Environment", College of Computing Georgia Institute of Technology, Atlanta, Georgia 30332, IBM Almaden Research Center, San Jose, CA 95120, printed on Feb. 22, 2017, 8 pages.

(Continued)

*Primary Examiner* — Reginald Bragdon
*Assistant Examiner* — Mehdi Namazi
(74) *Attorney, Agent, or Firm* — Isaac J. Gooshaw

(57) ABSTRACT

In a hierarchical storage system, blocks of data selected for auto-tiering migration, are selected based on dynamically adjusted group sizes. Contiguous blocks are organized into default groups. I/O activity of the blocks in a group is monitored. Based on the I/O activity, the default groups may be sub-divided into smaller sub-groups or combined into larger groups, to separate as much as practical, contiguous series of cooler blocks and contiguous series of hotter blocks into respective focused (concentrated) groups or sub-groups. The concentrated group or sub-group may then be migrated according to the average I/O activity of the included blocks. Group configurations are continually and dynamically adjusted according to changing I/O conditions.

1 Claim, 12 Drawing Sheets

(56) References Cited

U.S. PATENT DOCUMENTS

| | | | | |
|---|---|---|---|---|
| 2015/0326656 | A1* | 11/2015 | Guo | H04L 67/1008 709/226 |
| 2016/0004473 | A1* | 1/2016 | Chiu | G06F 3/0649 710/74 |
| 2016/0283129 | A1 | 9/2016 | Wang et al. | |

OTHER PUBLICATIONS

Gong et al., "Automatic Tiering of Storage Using Dynamic Grouping", U.S. Appl. No. 15/499,022, filed Apr. 27, 2017, pp. 1-35.

IBM Appendix P., "List of IBM Patents or Patent Applications to be Treated as Related", Dated Dec. 19, 2017, 2 pages.

* cited by examiner

| Table 1. Default grouping ($T_0$). | | |
|---|---|---|
| Blocks | Default group on SSD tier | Default group on ENT tier |
| 1st block set | 1st group | 1st group |
| 2nd block set | 2nd group | 2nd group |
| ... | ... | ... |
| 1024th block set | 1024th group | 1024th group |

FIG. 3A

Table 2. First New grouping ($T_1$).

| New group size on SSD (64MB) | | | | New group size on ENT (64MB) | | | | Block (16 MB) | Default group on SSD (1GB) | Default group on ENT (1GB) |
|---|---|---|---|---|---|---|---|---|---|---|
| 1 | 2 | ... | 16 | 1 | 2 | ... | 16 | 1st block set | 1st group | 1st group |
| N/A | | | | N/A | | | | 2nd block set | 2nd group | 2nd group |
| . . . | | | | . . . | | | | . . . | . . . | . . . |
| 1 | 2 | ... | 16 | 1 | 2 | ... | 16 | 1024th block set | 1024th group | 1024th group |

Table 3. Second New grouping ($T_2$).

| New group size on SSD (64MB) | | | | New group size on ENT (64MB) | | | | Block (16MB) | Default group on SSD (1GB) | Default group on ENT (1GB) |
|---|---|---|---|---|---|---|---|---|---|---|
| 1 | 2 | ... | 16 | 1 | 2 | ... | 16 | 1st block set | 1st group | 1st group |
| 1 | 2 | ... | 16 | 1 | 2 | ... | 16 | 2nd block set | 2nd group | 2nd group |
| . . . | | | | . . . | | | | . . . | . . . | . . . |
| N/A | | | | N/A | | | | 1024th block set | 1024th group | 1024th group |

FIG. 3C

| Table 4A. Initial Group<br>Initial block (extent) distribution ($T_0$) | |
|---|---|
| Tier | Blocks<br>(16MB each) |
| Solid state drive (SSD) | 0, 1, 5-6 |
| Enterprise disk (ENT) | 2, 3, 7, 8-47 |
| Nearline disk (NL) | 4, 48-63 |

FIG. 4A

| Table 4B. Sub-Groups<br>Updated block (extent) distribution ($T_1$) | | | | |
|---|---|---|---|---|
| $1^{st}$ block (1GB) | $1^{st}$ Sub-group (64MB) | $2^{nd}$ Sub-group (64MB) | $3^{rd}$–$12^{th}$ Sub-groups (64MB) | $13^{th}$–$16^{th}$ Sub-groups (64MB) |
| SSD tier | 0, 1 | 5, 6 | NA | NA |
| ENT tier | 2, 3 | 7 | 8-47 | NA |
| NL tier | NA | 4 | NA | 48-63 |

FIG. 4B

| TABLE 5A. DEFAULT GROUP DISTRIBUTION ||||| 
|---|---|---|---|---|
| SUB-GROUP SIZE ON SSD (64MB) | SUB-GROUP SIZE ON ENT (64MB) | 1TB VOLUME WITH 1GB GROUP SIZE | DEFAULT GROUP ON SSD (1GB) | DEFAULT GROUP ON ENT (1GB) |
| N/A | N/A | $1^{ST}$ GB | $1^{ST}$ GROUP | $1^{ST}$ GROUP |
| N/A | N/A | $2^{ND}$ GB | $2^{ND}$ GROUP | $2^{ND}$ GROUP |
| N/A | N/A | ... | ... | ... |
| N/A | N/A | $1024^{TH}$ GB | $1024^{TH}$ GROUP | $1024^{TH}$ GROUP |

FIG. 6A

| TABLE 6B. SUB-GROUP DISTRIBUTION | | | | | | | | | | |
|---|---|---|---|---|---|---|---|---|---|---|
| SUB-GROUP SIZE ON SSD (64MB) | | | | SUB-GROUP SIZE ON ENT (64MB) | | | | 1TB VOLUME WITH 1GB GROUP SIZE | DEFAULT GROUP ON SSD (1GB) | DEFAULT GROUP ON ENT (1GB) |
| 1 | 2 | . . . | 16 | 1 | 2 | . . . | 16 | $1^{ST}$ GB | $1^{ST}$ GROUP | $1^{ST}$ GROUP |
| 1 | 2 | . . . | 16 | 1 | 2 | . . . | 16 | $2^{ND}$ GB | $2^{ND}$ GROUP | $2^{ND}$ GROUP |
| N/A | | | | N/A | | | | . . . | . . . | . . . |
| N/A | | | | N/A | | | | $1024^{TH}$ GB | $1024^{TH}$ GROUP | $1024^{TH}$ GROUP |

| TABLE 5C. RECLAIMED GROUP |||||
|---|---|---|---|---|
| SUB-GROUP SIZE ON SSD (64MB) | SUB-GROUP SIZE ON ENT (64MB) | 1TB VOLUME WITH 1GB GROUP SIZE | DEFAULT GROUP ON SSD (1GB) | DEFAULT GROUP ON ENT (1GB) |
| 1, 2, ..., 16 | 1, 2, ..., 16 | $1^{ST}$ GB | $1^{ST}$ GROUP | $1^{ST}$ GROUP |
| SKEW INFO. WITH LEASE | SKEW INFO. WITH LEASE | $2^{ND}$ GB | $2^{ND}$ GROUP | $2^{ND}$ GROUP |
| N/A | N/A | ... | ... | ... |
| N/A | N/A | $1024^{TH}$ GB | $1024^{TH}$ GROUP | $1024^{TH}$ GROUP |

FIG. 6C

AUTOMATIC TIERING OF STORAGE USING DYNAMIC GROUPING

BACKGROUND OF THE INVENTION

The present invention relates generally to the field of hierarchical storage management, and more particularly identification and migration of hot and cold data blocks.

In the field of hierarchical storage, a logical volume is formed by data blocks. In a hybrid storage system, each block may be located on a different type of storage device, such as a solid-state drive or a magnetic hard drive, for example. Storage tiers, made up of the different types of storage devices, are defined based on the device characteristics. Users configure their storage system, based on certain considerations such as workload, performance, capacity and cost requirements.

Automated storage tiering (sometimes herein referred to as auto-tiering) is automated promotion or demotion of data blocks, or extents, across different tiers of storage devices and media. A block (an "extent") is a contiguous area of storage reserved for a file, or a portion thereof, in a file system. As used herein, an extent and a block are synonymous and the terms may be used interchangeably. Different tiers (types) of storage device operate with different speeds, latencies and costs. A block that is accessed more often (a block having high "heat") may be stored on a higher tier that may be faster but scarcer and more expensive, while a block that is accessed less often may be stored on a lower tier that may be slower but more plentiful and less expensive. Other considerations (for instance, required security level) may also be used in assigning certain extents to a given tier.

SUMMARY

According to an aspect of the present invention, there is a method, computer program product and/or system that performs the following operations (not necessarily in the following order): (i) receiving a first input/output (I/O) statistics dataset with respect to a multi-tier storage system, where the multi-tier storage system comprises: a first storage tier and a second storage tier, a plurality of data groups including a first data group, wherein the first data group comprises a first data block and the first data block is stored on the first storage tier, wherein the first I/O statistics dataset includes information pertaining to a first activity metric value corresponding to I/O activity with respect to the first data block; determining a first group score with respect to the first data group, where the first group score is based, at least in part, on the first activity metric value; determining that the first group score is above an upper threshold value; in response to determining that the first group score is above the upper threshold value, partitioning the first data group into a plurality of data sub-groups including a first data sub-group, where the first data sub-group comprises the first data block; and migrating the first data sub-group to the second storage tier.

BRIEF DESCRIPTION OF THE DRAWINGS

FIG. 3A is a default grouping table showing an example storage data distribution in accordance with at least one embodiment of the present invention;

FIG. 3C is a second new grouping table showing an example storage data distribution in accordance with at least one embodiment of the present invention;

FIG. 4A is an initial block distribution table showing an example storage data distribution in accordance with at least one embodiment of the present invention;

FIG. 4B is an updated block distribution table showing an example storage data distribution in accordance with at least one embodiment of the present invention;

FIG. 6A is a default group distribution (Table 5A) in accordance with at least one embodiment of the present invention;

FIG. 6C is a reclaimed group distribution (Table 5C) in accordance with at least one embodiment of the present invention.

DETAILED DESCRIPTION

Figure 1:
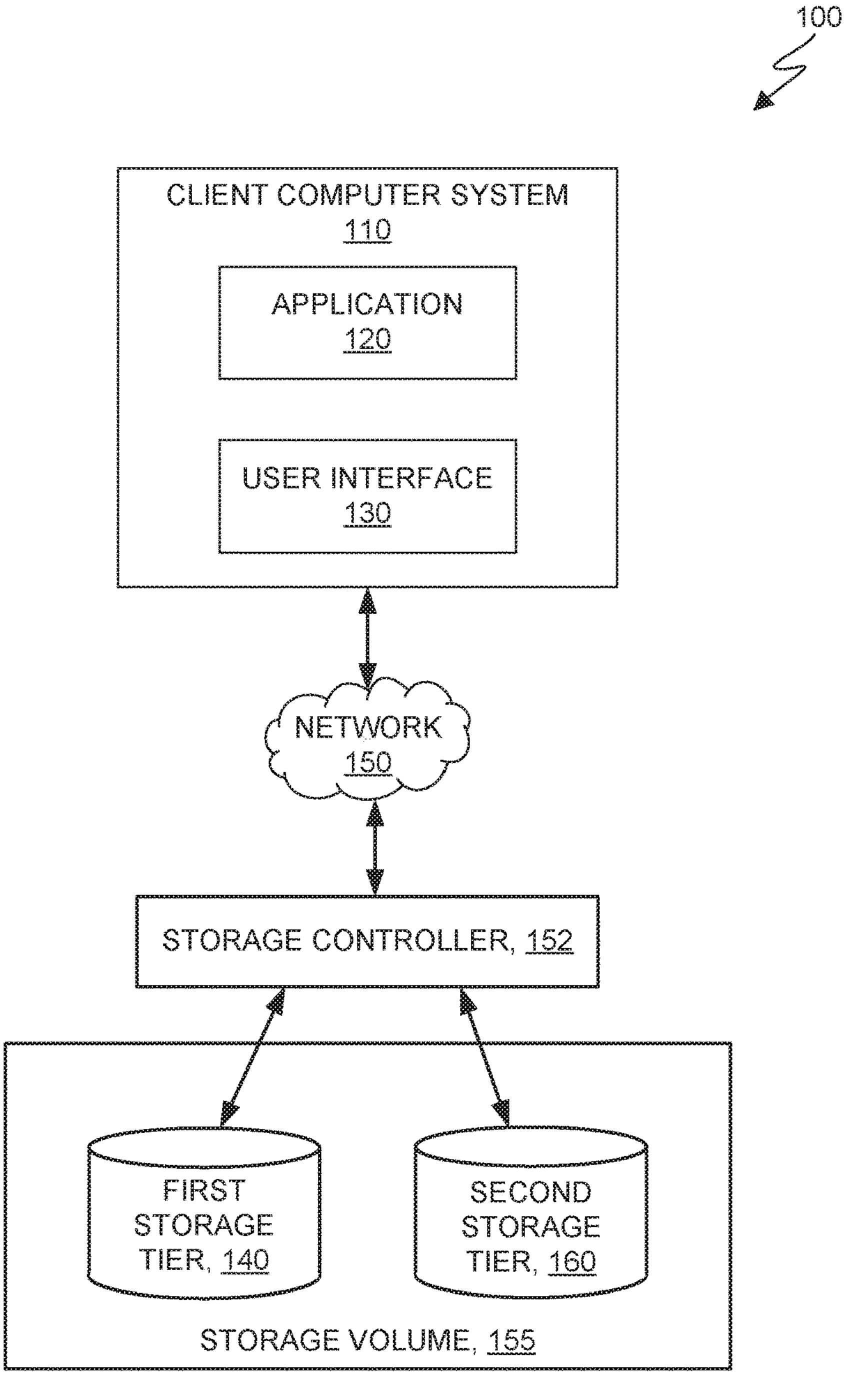
FIG. 1 is a functional block diagram depicting a computing environment in accordance with at least one embodiment of the present invention.

In a hierarchical storage system, blocks of data are selected for auto-tiering migration, based on dynamically adjusted group sizes. Contiguous blocks are organized into default groups. I/O activity of the blocks in a group is monitored. Based on the I/O activity, the default groups may be sub-divided into smaller sub-groups or combined into larger groups, to separate as much as practical, contiguous series of cooler blocks and contiguous series of hotter blocks into respective focused (concentrated) groups or sub-groups. The concentrated group or sub-group may then be migrated according to the average I/O activity of the included blocks. For example, hotter groups may be migrated to a faster storage tier and cooler groups may be migrated to a slower storage tier. Group configurations may be continually and dynamically adjusted according to changing I/O conditions.

A data block (sometimes herein referred to as an extent) is the smallest data unit (atomic data unit) eligible for migration between tiers. The size of a block is fixed by the design of the storage system. A group or sub-group links to a sequential series of blocks. When the system migrates a group of blocks between tiers, it migrates all the blocks of the group or sub-group.

The system monitors I/O activity with respect to the blocks in a group. If the overall activity for the group (group score) exceeds a first threshold, the system partitions (divides) the group into a sequential series of sub-groups. The system then monitors the I/O activity of the sub-groups. The monitoring, and sub-division processes may be iterated, in which sub-groups are further sub-divided into yet smaller sub-groups. Sub-groups having sufficient I/O activity are then migrated to a higher-performing storage tier. Conversely, if the group scores for a sequential series of data sub-groups fall below a second threshold, it may migrate the sub-groups to a lower performance storage tier, and may combine the smaller sub-groups into a larger group.

In some embodiments of the present invention there are more than two tiers. Each tier is divided into multiple contiguous groups where each group has same size and may include multiple blocks. A block can be located on either a higher performance tier or a lower performance tier, based on the initial layout of the group and later migration activities.

The storage system monitors, and updates in real-time, the I/O statistics of each block. When a block belongs to one group of a tier (for example, a default group), the system uses the block's I/O statistics to determine the group's I/O activity metrics (sometimes herein referred to as the group score). The system calculates the group score based on block I/O statistics over a time interval. If the group score is above an upper threshold value and is the highest of all the group scores, the group is partitioned into a plurality of data sub-groups where each block belongs to a sub-group, but still maintains its association with the original default group. The system uses the block's I/O statistics to determine, over another time period, the sub-group's score. If a sub-group's score is above the upper threshold value, the system migrates the blocks in the sub-group to a higher performance tier. Conversely, if a sub-group in a higher performance tier has a low score, the system migrates blocks in the sub-group to a lower performance tier.

By dynamic application of the sub-division and re-combination of groups and sub-groups, the system carries out auto-tiering migrations of data in a more efficient manner to further the objective of maximizing storage system performance.

The present invention will now be described in detail with reference to the Figures.

Figure 6B:
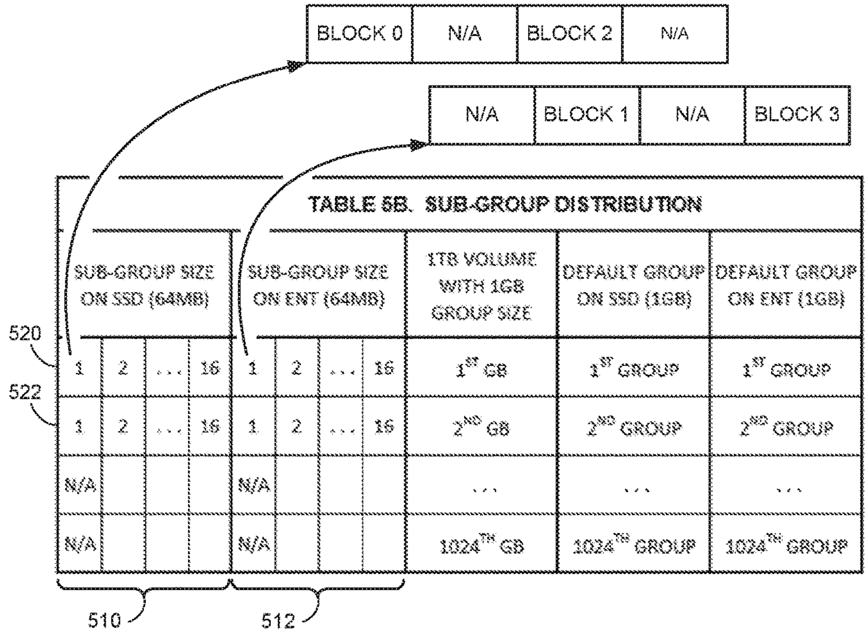
FIG. 6B is a sub-group distribution (Table 5B) in accordance with at least one embodiment of the present invention.

FIG. 1 is a functional block diagram depicting a computing environment 100 in accordance with an embodiment of the present invention. Computing environment 100 includes client computer system 110, which can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 6. Computing environment 100 further includes application 120, user interface 130, storage controller 152, storage volume 155, 1$^{st}$ storage tier 140 and 2$^{nd}$ storage tier 160. Each storage tier (such as 1$^{st}$ and 2$^{nd}$ tiers) may comprise a given type of physical storage device (such as a flash drive, a solid state drive (SSD), a 15K/10K enterprise disk (ENT), 7.2K nearline disk (NL), a tape drive, etc.). Acting in concert, the various tiers appear to a user as a single volume. Any given data block (extent), as unit of sub-volume, may be located on any tier. By gathering I/O statistics at the block level of granularity. A group of blocks with strong I/O activity is identified and may be migrated to a higher performance tier (promoted), such as a flash drive or SSD. Conversely, a group of blocks with little or no I/O activity may be migrated to a lower performance tier (demoted) such as an enterprise or nearline disk, tape drive, for example.

In some embodiments of the present invention there are more than two tiers. For example, a storage system may include four tiers in ascending order of performance (that is, a descending order of latency) as follows: (i) a tape library tier; (ii) a magnetic hard drive tier; (iii) an optical drive tier; (iv) a solid-state drive tier. Some embodiments may include other types of storage devices, and these drives may be configured into other arrangements of tiers. For simplicity, FIG. 1 shows two tiers, but the concept is extensible to any number of tiers including of any number of types of storage devices, now known or to be developed in the future, and arranged in any configuration.

Some embodiments of the present invention may recognize one, or more, of the following facts, potential problems and/or potential areas for improvement with respect to the current state of the art: (i) storage capacity, especially in large storage systems, is continually increasing; (ii) as block size is decreases, from GB levels, to megabyte (MB) levels and even to kilobyte (KB) levels, there is a proportionate increase in the number of data blocks in a system; (iii) with the increasing numbers of blocks, it becomes increasingly difficult (and costly) to monitor I/O performance, for all blocks, with sufficient accuracy because resources (central processing unit (CPU) cycles and memory) and time needed to collect the performance data are restricted at a certain levels. Further to item (ii) above, a block is set at a fixed size and is the smallest unit (an atomic unit) of data that is eligible for migration between storage tiers.

Some embodiments of the present invention use a dynamic grouping method to improve the performance of a multi-tiered storage system under specified resource limitations.

As more and more data is produced and stored, storage systems are provided that having capacities of 1 petabyte (PB), 8 PB or even more. This trend is likely to continue indefinitely. Concurrently, block (extent) size may be reduced from gigabyte (GB) levels of magnitude to megabyte (MB) levels or even kilobyte (KB) levels to gain more efficiency with respect to thin provisioning and replication. For example, using a 1 MB block size on a 2 PB capacity volume, there are $2\times1000\times1000\times1000$ ($2\times10^9$) blocks. As the number of extents increases, there is a proportional increase in the time and resources needed to complete statistical I/O machine learning with respect to the extents. Further, the learning time may be unacceptably high given certain real time requirements. For example, for a volume of 2 PB capacity (or larger) using a block size of 1 MB, it may take 10 minutes or more to compute I/O statistics based on the extents, and it may require more than 100 GB of storage to store the statistics. If using a smaller extent size, for example 4 KB, the amount of CPU resources and memory needed to maintain the same level calculations may increase by a multiplying factor of 256 (that is, 100 GB×256=25,600 GB=25.6 Terabytes). In storage volumes of such magnitude and extent size, levels of time and resources needed to provide real-time extent I/O statistics feedback may become prohibitive.

Some embodiments of the present invention may include one, or more, of the following features, characteristics and/or advantages: (i) a dynamic grouping method based on the sub-logical unit number (sub-LUN) I/O statistics under bound of resource with acceptable accuracy (note: a logical unit number (LUN) identifies a physical storage device, such as a hard disk drive, a tape drive, solid state drive, etc.); (ii) each volume in a hybrid tiered pool is logically partitioned into sequential blocks of a fixed size, such as 1 GB, based on logical block address (LBA) range; (iii) each block (sometimes herein referred to as an extent) is linked to a group of blocks of the same size; (iv) I/O statistics pertaining to the blocks within a group are accumulated; (v) a group is the basic unit for the I/O statistics; (vi) in a hybrid pool, each block can be independently located on an appropriate tier; and/or (vii) each block of a volume maps to a group in each tier which is referred to as a default group. Further to item (ii) above, a hybrid tiered storage system combines two or more types of storage devices that act in concert to provide a single pool of storage resources.

In the following few paragraphs, the following definitions will be used:

N=maximum number of groups for which a storage system can collect and maintain I/O statistics (under certain practical resource limitations such as processing cycles, and time limits)

B=fixed block size

M=number of default groups in a tier=storage capacity (of the tier)/default group size T=number of tiers in a storage system R=hot block ratio=number of hot blocks in a volume/total number of blocks in the volume In some embodiments of the present invention, due to practical processing and storage system limitations, a storage system can support N groups with respect to gathering I/O statistics and performing associated calculations. N may be much larger than M. If the storage system supports thin provisioning, M will be even smaller than the total capacity of the volumes. As N is larger than M, the expression (N−(T×M)) provides a useful indicator as to how far group size (the level of granularity for gathering I/O statistics) can be reduced.

A block can be located on any given tier and can be migrated from tier to tier.

$$M \times B \times R = (N - (T \times M)) \times \text{new group size}/T.$$

In some embodiments of the present invention, the new group size is computed from the following expression: (i) includes multiple extents; and (ii) is an integer multiple of the fixed block size.

$$NGS = \frac{M \times B \times R \times T}{[N - (T \times M)]}$$

In some embodiments of the present invention, hot blocks may use a smaller new group size to collect I/O statistics. The smallest potential group size is equal to the smallest physical extent size (also known as the fixed block size, B).

In some embodiments of the present invention, a data block is considered to be a hot block if an I/O activity metric involving the block is above a certain threshold value. The I/O activity metric with respect to given block, over a given time interval, may include one or more of the following example types of information: (i) the number of I/O operations performed; (ii) the total amount of data transferred; (iii) the frequency of I/O operations; (iv) a time-weighted average of data transfer; and/or (v) any combination of, or calculation based upon, the foregoing types of information, etc.

When a hot block ceases to be considered hot ("cools off") the smaller groups (created when the block was considered to be hot) are reclaimed and the default group size is restored and used going forward, to represent I/O statistics of extents in the block.

In some embodiments of the present invention, when a cold block becomes hot, the newly hot block may be subdivided into multiple sub-groups, thereby providing a finer granularity and more accurate I/O statistics when compared to the less granular statistics of the non-subdivided group. Therefore, auto-tiering migration based on the finer granularity more efficiently manages the promotion and demotion respectively of hot and cold extents within the bounds of the various storage resources available in the storage system.

Figure 2A:
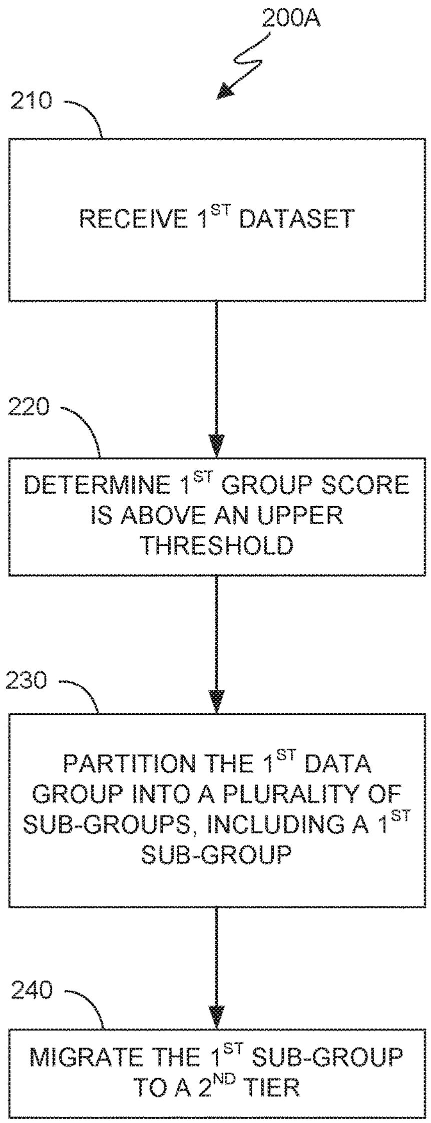
FIG. 2A is a flowchart showing a method in accordance with at least one embodiment of the present invention.
Figure 2B:
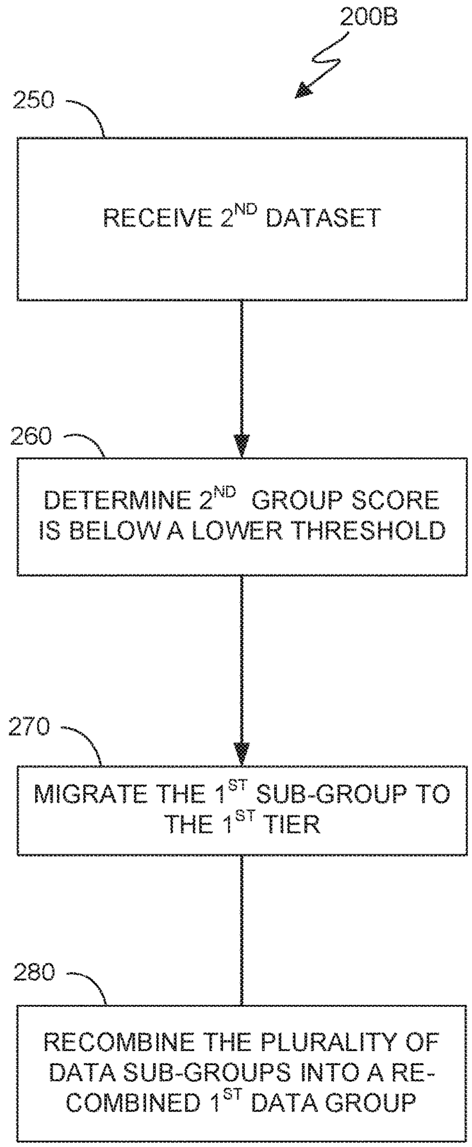
FIG. 2B is a flowchart showing a method in accordance with at least one embodiment of the present invention.

An example embodiment method is now presented with reference to flowcharts 200A and 200B, respectively of FIGS. 2A and 2B. Processing begins at operation 210 of flowchart 200A, where a storage system controller receives a first dataset. The first dataset includes information with respect to input/output (I/O) activity of a default data group (or default group), and more particularly, of individual data blocks within the default group.

Processing proceeds at operation 220, where the storage system controller determines a data group score based on the first dataset. The I/O activity of the individual data blocks within the parent group are combined to produce an average. In some embodiments of the present invention, the data is combined into an average, such as a mean computed from a single metric measured for each block. Alternatively, the average may be computed in any of various ways, an example of which may be an integrated time-weighted average. Some embodiments may base the average on relative networking distances (such as latencies) between the I/O blocks and the client computers that interact with the blocks through I/O requests. In any event, the storage controller determines that the group score exceeds the upper threshold value, meaning that the default data group is considered a hot group.

Processing proceeds at operation 230, where the storage system controller sub-partitions, or sub-divides, the default group into a plurality of smaller sub-groups, including a first sub-group, to gain finer granularity with respect to the individual blocks. The plurality of sub-groups, in totality, contain the same plurality of blocks that were contained in the default group. The objective in sub-dividing the default group is to focus in on the most active blocks (the hot blocks) within the group, and to separate as much as practical, contiguous series of cooler blocks and contiguous series of hotter blocks into respective focused (concentrated) sub-groups. The unit of migration is a data group or sub-group, including all blocks within the group or sub-group. Therefore, by the process of identifying hot blocks and subdividing the groups (and, sometimes iteratively, the sub-groups), we increase the density of hot blocks in certain sub-groups, and migrate just the hot sub-groups, leaving the cooler sub-groups stored where they are, or if appropriate, migrating them to a lower performance tier.

Processing proceeds at operation 240, where the storage system controller migrates the first data sub-group to a second storage tier. In the embodiment of FIG. 2A, the second storage tier is a higher performance tier.

As shown in the embodiment of flowchart 200B of FIG. 2B, processing begins at operation 250, where the storage system controller receives a second dataset. The second dataset includes information with respect to I/O activity of the first data sub-group stored on the second storage tier.

Processing proceeds at operation 260, where the storage system controller determines a data sub-group score based on the second dataset. The score is computed in a fashion similar to the method of operation 220 above. In the present method, the storage controller determines that the group score is less than a lower threshold value, meaning that the first sub-group, as a whole, is no longer considered a hot group, and in fact is now considered cold.

Processing proceeds at operation 270, where the first sub-group is migrated to back to the first storage tier. In the embodiment of FIG. 2B, the second storage tier is a lower performance tier.

Processing proceeds at operation 280, where the storage system controller re-combines the first data sub-group with at least some of the other sub-groups of the original default group.

Figure 2C:
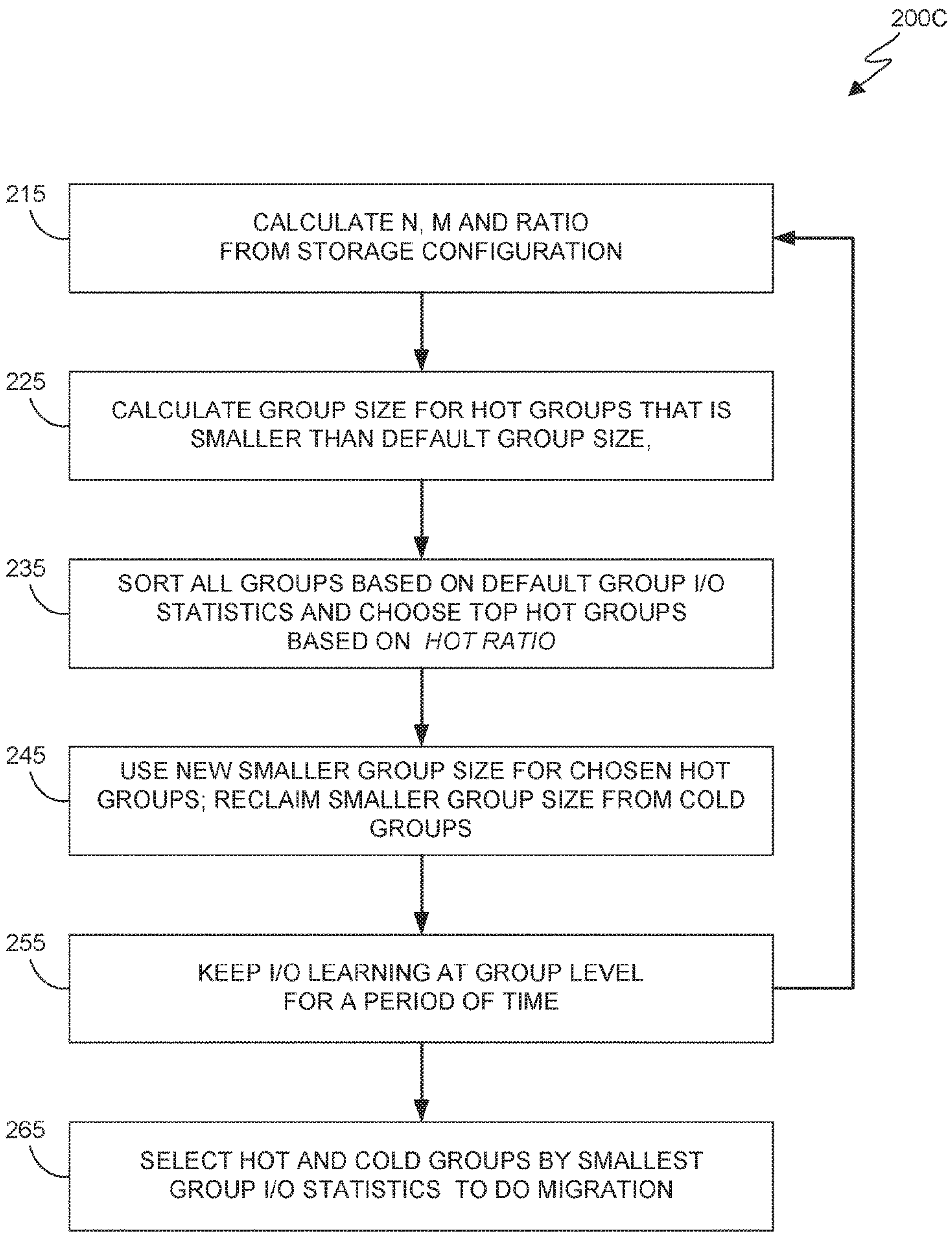
FIG. 2C is a flowchart showing a method in accordance with at least one embodiment of the present invention.

With reference now to flowchart 200C of FIG. 2C, another embodiment method will be discussed. Processing begins at operation 215 where the storage system controller computes the following factors: (i) the maximum number of groups for which the system is able to collect I/O statistics (N); (ii) the storage capacity of the system divided by the default group size (M); and a ratio of "hot" groups to the total number of groups in the system (R or "hot ratio").

Processing proceeds to operation 225 where the storage system controller calculates a group size for hot groups that is smaller than the default group size.

Processing proceeds to operation 235, where the storage system controller sorts all groups based, on I/O statistics collected with respect to the default groups, to identify the most active hot groups. In this embodiment, the top hot groups have a ratio of hot blocks to cool blocks (a hot density) that is higher than the system hot ratio.

Processing proceeds to operation 245, where the system controller sub-divides the most active hot groups into sub-groups of size determined in operation 225 above, and reclaims (recombines) cold sub-groups into larger groups.

Processing proceeds to operation 255, where the system controller continues collecting I/O statistics for all groups in the system, to gain sufficient information regarding the current state of the storage system, and to properly inform decisions with respect to further sub-division and/or re-combination of the various groups and sub-groups.

Processing continues indefinitely, looping back to operation 215, for continuous monitoring, calculating, sub-dividing and re-combining, to create groups where the blocks in each group are closely matched (within practical levels) with regard to their level of I/O activity, and the averaged I/O activity for a given group will reasonably match the I/O activities of the individual blocks included therein. To illustrate: (i) a large contiguous range of data blocks that have little or no I/O activity may be concentrated into a large group and may eventually migrate to a lower performance storage tier; (ii) a large contiguous range of blocks that have a great deal of I/O activity may be concentrated into a large group and may eventually migrate to a higher performance storage tier; (iii) a large group of blocks where small contiguous ranges of hot blocks are interspersed with small contiguous ranges of cold blocks may eventually be sub-divided into small sub-groups, where each sub-group has mainly hot blocks or mainly cold blocks, and each sub-group, hot or cold, may migrate respectively to higher or lower performance storage tiers.

Processing continues at operation 265 where the storage controller migrates the concentrated hot and cold groups respectively to higher and lower storage tiers.

Figure 3B:
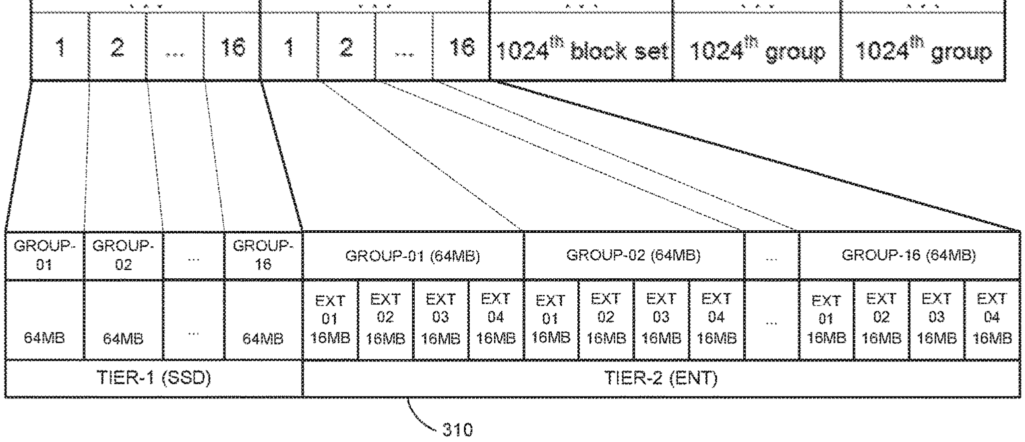
FIG. 3B is a first new grouping table showing an example storage data distribution in accordance with at least one embodiment of the present invention.

The following example embodiment is now presented for purpose of illustration, with reference to Tables 1, 2, and 3 of FIGS. 3A, 3B, and 3C. Assume a storage system volume with the following initial conditions is given: (i) block size is fixed at 16 MB; (ii) the volume has 1 terabyte (TB) of capacity; (iii) the volume is divided into 1024×64 sequential blocks; (iv) the volume has 2 tiers in the pool, a solid state drive tier (SSD, tier-1) and an enterprise disk tier (ENT, tier-2); and (v) initially there are 1024×2 default groups for I/O statistics collection linked to the blocks on each tier. Table 1 of FIG. 3A summarizes these initial conditions.

After a first period of gathering I/O statistics (learning), the following conditions are observed and/or created: (i) based on "hot block" ratio (R, see definition above) information included in the gathered I/O statistics, the $1^{st}$ group and the $1024^{th}$ group are determined to be hot and have scores above a threshold; (ii) a new smaller group size is set at 64 MB for the $1^{st}$ and $1024^{th}$ groups; (iii) a new smaller group size is established for the hot blocks, including 4 extents in each block; and (iv) each extent size is 16 MB.

Table 2 of FIG. 3B summarizes the conditions established after this first period of collecting I/O statistics as follows: A new sub-group size (64 MB) is shown in expanded view 310. For example, tier-1 (a tier made up of SSDs) includes 16 sub-groups (group-01, group-02 . . . group-16), where each group is 64 MB. Similarly, tier-2 (a tier made up of ENTs) is also divided into 16 sub-groups of 64 MB each. Each of these 64 MB sub-groups, in tier-1 and tier-2, is further subdivided into 4 extents of 16 MB each. Expanded view 310 shows the extent subdivisions in tier-2 only (for simplicity). However, it is to be understood that the 16 groups of tier-1 are also subdivided into 4 extents of 16 MB each, in the same manner.

After a second period of collecting I/O statistics, the $2^{nd}$ default group is determined to have become hot and 1024th default group is determined to have cooled and is no longer hot. Table 3 of FIG. 3C summarizes the conditions established after this second period of I/O learning.

Some embodiments of the present invention further use sub-grouping. For example, assume a 1 GB group is divided into 16 groups of 64 MB each due to the level of I/O activity within the original 1 GB group. Next, assume that subsequent collection of I/O statistics reveals that the levels of I/O activity in groups 4 and 9 accounted for all the I/O activity of the original 1 GB group. In this embodiment, groups 4 and 9 may then be promoted to a higher performance storage tier while the remaining 14 groups remain, or may even be demoted to a lower performance storage tier.

The following example serves to illustrate how a new group size is calculated. Assume the following initial conditions: (i) a storage system is able to support a maximum of 128 million groups ($N=128\times10^6$), based on practical limitations with respect to CPU/memory and learning cycle time; (ii) the storage system has 2 PB of storage capacity; and (iii) the storage system capacity is distributed among 3 tiers (SSD, ENT, and NL). In some embodiments of the present invention, the storage system needs at least 6 million groups (2×1024×1024 (GB)×3 (tiers)) to monitor all volumes at 1 GB group level from default groups on each tier. Therefore, there are $122\times10^6$ additional groups available ((128 [maximum]−6 [initial default])$\times10^6$). In the present example, the ratio of hot extents to total capacity is relatively low, and 20% of all extents (or fewer) are determined to be very hot (a 20% hot extent ratio). The remaining extents totaling 1.6 PB could potentially become hot. And if extent size is 16 MB with 3 tiers, the group size can be reduced to 64 MB. With 64 MB group size, each tier can have 40 million groups and the 2 PB capacity I/O statistics learning can be conducted at a finer granularity due to the smaller group size. Because each extent can only be located on one tier, the actual number of extents in a group can be even smaller, such as: (i) two 16 MB extents in an SSD 64 MB group; (ii) one 16 MB extent in an ENT group; and (iii) one 16 MB extent in an NL group.

An additional example embodiment will now be discussed with reference to Tables 4A and 4B respectively of FIGS. 4A and 4B. In this example embodiment, a default group (1 GB in size, containing 64 blocks of 16 MB each), is found to be "hot" (having a level of I/O activity that is significantly higher than the overall storage system level of I/O activity). Because of this, the default group is sub-divided to achieve a finer level of granularity with respect to group I/O activity. As shown in Table 4A, before the sub-division, the 64 blocks within the default group are distributed as follows: (i) blocks 0, 1, and 5-6 are on the solid state disk (SSD) tier; (ii) blocks 2, 3, 7, and 8-47 are on the enterprise disk (ENT) tier; and blocks 4, and 48-65 are on the nearline disk (NL) tier. I/O statistics of the various blocks is collected based on the default group size for the corresponding tier.

Upon the sub-division of the default group, the I/O activity (heat) of each 64 MB group is first inherited from the I/O statistics collected with respect to the default group on each tier, and the inherited data is used as baseline data. Once the default group has been sub-divided, I/O statistics collection is based on the smaller 64 MB sub-groups to represent block-level I/O statistics with finer granularity.

As shown in Table 4B, the 64 blocks of the default group, after the default group is sub-divided, are assigned to the various sub-groups as follows: (i) on the SSD tier: (a) blocks 0 and 1 are in the 1$^{st}$ sub-group, and (b) blocks 5 and 6 are in the 2$^{nd}$ sub-group; (ii) on the enterprise disk (ENT) tier: (a) blocks 2 and 3 are in the 1$^{st}$ sub-group, (b) block 7 is in the 2$^{nd}$ sub-group, and (c) blocks 8 through 47 are in the 3$^{rd}$ through 12$^{th}$ sub-groups; and (iii) on the nearline (NL) tier: (a) block 4 is in the 2$^{nd}$ sub-group, and (2) blocks 48 through 63 are in the 13$^{th}$ through 16$^{th}$ sub-groups.

Figure 5:
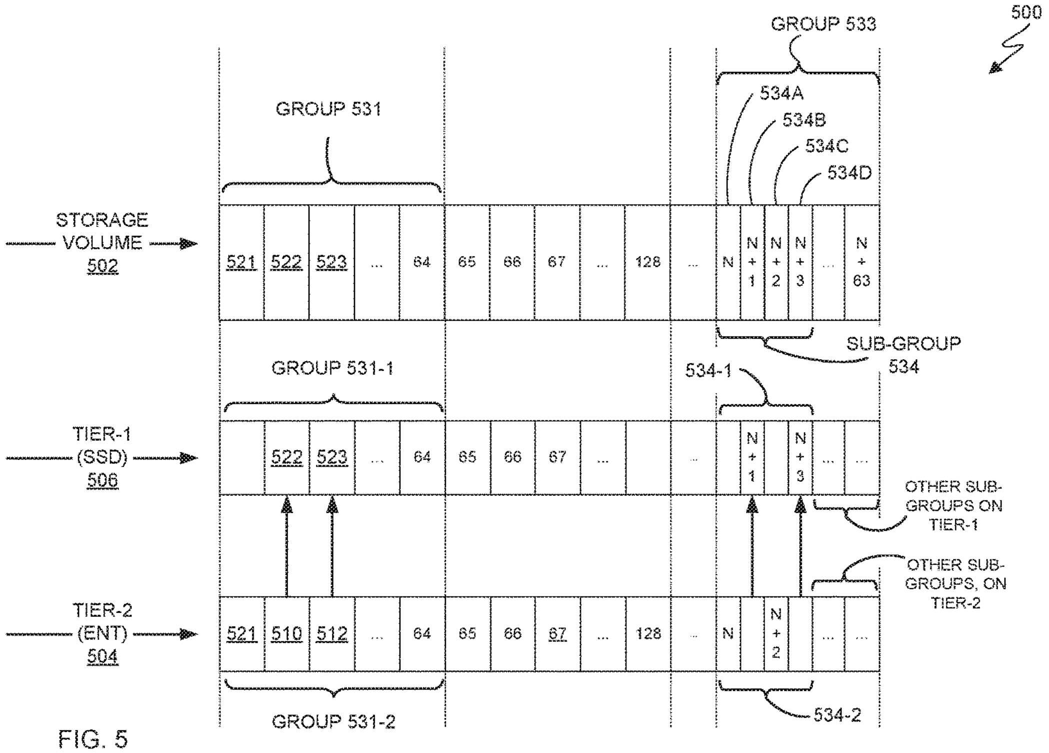
FIG. 5 is a storage map showing data group and data block distribution in accordance with at least one embodiment of the present invention.

In some embodiments of the present invention, any given data block can be located on only a single tier at any given time, as illustrated on storage map 500 of FIG. 5. Storage map 500 includes: storage volume 502; storage tier-2 504; storage tier-1 506; holes 510 and 512; blocks 521, 522 and 523; groups 531, and 533; sub-group 534; and blocks 534A, 534B, 534C, and 534D. Group 531 spans tiers 1 and 2, and is shown respectively as groups 531-1 and 531-2. Similarly, sub-group 534 spans tiers 1 and 2, and is shown as sub-groups 534-1 and 534-2.

Groups 531, and 533 are each 1 GB in size and each group includes 64 data blocks of 16 MB each. Group 533 is further sub-divided into 16 sub-groups, including sub-group 534, where each sub-group is 64 MB in size and includes 4 blocks of 16 MB each. Sub-group 534 includes blocks 534A, 534B, 534C, and 534D. Blocks 534A, 534B, 534C, and 534D are distributed between tier-2 504 and tier-1 506 as follows: blocks 534A and 534C are on storage tier-2 504; and blocks 534B and 534D are on storage tier-1 506. Sub-group 534 remains linked to blocks 534A, B, C, and D and is shown as sub-group 534-1, and sub-group 534-2, respectively corresponding to the parts on tier-1 and tier-2. The following is to be understood: (i) group 531-1 and 531-2 are in fact one group, group 531; and (ii) sub-groups 534-1 and 534-2 are in fact one group, sub-group 534.

Data blocks 522 and 523 of group 531 have become hot, so the storage system controller has moved them to tier-1 506. The storage space on tier-2 504, formerly occupied by blocks 522 and 523, is reserved as holes, shown respectively as holes 510 and 512. If blocks 522 and/or 523 are subsequently migrated back to tier-2, they are re-inserted into their respective hole 510 and/or 512.

Note that the term "tier-1" sometimes herein refers to a lower performance tier while other times, "tier-1" refers to a higher performance tier. Similarly, "tier-2" sometimes refers to a higher performance tier while other times, "tier-2" refers to a lower performance tier. The meaning, either way, is made clear by the context in which the terms are used.

Some embodiments of the present invention may include one, or more, of the following features, characteristics and/or advantages: (i) dynamically changes block groupings based on changing I/O patterns in a multi-tier storage system; (ii) more accurately identifies hot and cold blocks (is more narrowly focused, and identifies hot and cold blocks with finer granularity); (iii) more efficiently performs block migrations; (iv) minimizes migrating blocks that are not in need of migration by themselves, but are migrated as part of a group that is in need of migration, by more narrowly sub-dividing groups of blocks into smaller sub-groups and migrating only those sub-groups where the included blocks are mainly of similar levels of I/O activity ("heat"); (v) auto-tiering with dynamic grouping supports collection of I/O statistics on storage systems of very large capacity, with limited resources; and/or (vi) auto-tiering with dynamic grouping satisfies a real-time learning (statistical I/O data collection) requirements at minute levels with improved accuracy. Some embodiments may not have these potential advantages and these potential advantages are not necessarily required of all embodiments.

Some embodiments of the present invention may further include one, or more, of the following features, characteristics and/or advantages: (i) a block is a basic, or atomic, unit of storage with respect to the present invention, and for migrating data between tiers, cannot be further divided; (ii) a group comprises any number of blocks (for example, if the block size on a given storage system is 16 MB, a 1 GB group includes 64 blocks, whereas a 64 MB group includes 4 blocks); (iii) a group is mapped to a volume (for example, a 10 GB volume may have, 10 groups of 1 GB each; (iv) a group may include blocks on more than one tier; (v) group sizes may vary (and groups may include different numbers of blocks); and/or (vi) "block" ("extent") and "volume" are physical concepts whereas "group" is a logical container that wraps a set of blocks.

Some embodiments of the present invention may recognize one, or more, of the following facts, potential problems and/or potential areas for improvement with respect to the current state of the art: (i) some current systems are based on a resource limitation as to the maximum storage capacity that can be supported by auto-tiering; (ii) if storage capacity is larger than the limitation, the excess storage capacity cannot leverage auto-tiering to have high performance in hybrid pools; (iii) based on resource limitations, use of larger group sizes and averaging cannot easily differentiate the hot blocks from cold ones in a group; and/or (iii) the accuracy and efficiency for further block migration (relocation) may be degraded.

In some embodiments of the present invention, an objective is to concentrate contiguous data blocks that have similar levels of I/O activity into a common group or sub-group. In some cases, this means sub-dividing a large group, that has contiguous sections of hot blocks interspersed among contiguous sections of cold blocks, into smaller sub-groups where each sub-group is populated by contiguous blocks having similar levels of I/O activity. Another objective is to concentrate a contiguous series of groups (or sub-groups) into a single group, where the blocks in the groups have similar levels of I/O activity.

Some embodiments of the present invention use certain I/O statistics gathered with respect to the blocks within a group to determine whether to migrate the group from one tier to another. In some embodiments of the present invention, the "heat" of a group, is determined by averaging the I/O activity of the blocks within the group. When the method determines that a group or sub-group will be migrated, it migrates all blocks within the entire group (or sub-group) including certain blocks within the group that by themselves are not considered to be in need of migration.

Examples of I/O statistics gathered during a period of observation with respect to a block include for example: (i) the number of times an input or output operation is conducted with respect to the block; and/or (ii) the data volume read from or written to the block.

Some embodiments of the present invention attach I/O statistics to each group on each tier. Blocks are always linked to a group and/or sub-group. If part of a group is very hot, the group is selected for another level of sub-division and additional I/O statistics are linked to the resulting sub-groups. The storage system migrates blocks based on the statistics collected for the smallest group, or sub-group, to which the block is linked.

Some embodiments of the present invention may include one, or more, of the following features, characteristics and/or advantages: (i) a dynamic grouping method for block I/O pattern learning (gathering I/O statistics) improves accuracy under a constrained resource environment; (ii) based on resource constraints, calculates a maximum number of blocks (N) that can be supported with respect to I/O statistics collection and I/O pattern learning; (iii) groups multiple separate sequential blocks into a single group based on volume logical block address (LBA); (iv) allocates a sample subset (M) of N block samples on which to perform I/O pattern learning, where the I/O statistics with respect to the subset of M blocks are applied to N on each large group where M is much smaller than N; (v) retains I/O pattern learning for a predetermined time window and determines which groups are the hottest groups in a certain percentage of all groups in system (% hot); (vi) available remaining block samples (N−M) are then assigned to partition a large group into smaller sequential groups to learn I/O patterns at finer granularity; and (vii) each block inherits the I/O pattern learned from its large group (parent group) and simultaneously can get a more accurate I/O pattern (focused more closely on the block) when the block is linked to a smaller group. Further to item (i) above, a storage system has certain resource constraints. For example, some of these constraints include limits on: (i) memory available for the operating system that controls the storage system; (ii) CPU processing cycles that the storage system can use without significantly degrading performance of other systems sharing the same CPUs; and/or (iii) time over which collected I/O statistics become stale and less meaningful due to dynamically changing conditions.

Further to items (iii) and (iv) in the paragraph above, I/O statistics and learned patterns are recalculated regularly in recognition of the dynamic nature of a storage system wherein over time, hot groups may become cold and/or cold groups may become hot.

In some embodiments of the present invention, with respect to a smaller group (a sub-group) a skew function with a time lease is generated. If a sub-group is reclaimed (for example because it becomes cold and falls below a pre-determined hot percentage), the skew function is used to regain the relative I/O pattern weight of the large group into which it is reclaimed. The skew function further helps to differentiate the I/O pattern of a block when the block is only in a large group (not in a sub-group), thereby avoiding inefficient migration across high performance and low performance tiers.

The methods above improve accuracy of I/O pattern learning in a constrained resource environment. Consequently, the overall performance of a multi-tier storage system is enhanced by sub-dividing or re-combining groups as appropriate.

Some embodiments of the present invention may include one, or more, of the following features, characteristics and/or advantages: (i) dynamic grouping makes optimal use of constrained resources in a multi-tier storage environment; (ii) dynamic grouping improves accuracy of I/O pattern learning; (iii) skew function with a time lease holds more accurate I/O pattern of individual blocks when the blocks leave a smaller group and rejoin a larger group; and/or (iv) avoids the adverse performance impact caused by less efficient migration by improving migration efficiency.

In some embodiments of the present invention, a dynamic grouping method includes the following operations: (i) storage controller 152 groups multiple data blocks into a group based on the logical block addresses (LBA) of the blocks; (ii) the storage controller collects patterns of I/O activity at the group-level (the group-level granularity does not provide block-level I/O statistics); (iii) re-configure grouping/sub-grouping based on block I/O activity; and (iv) apply skew information (with time lease) to protect against unnecessary migration. The steps of this dynamic grouping method will be explained in the following paragraphs.

Storage controller 152 groups multiple data blocks into a group based on the logical block addresses (LBA) of the blocks. Assuming a block size is 16 MB, and group size is 1 GB, 64 sequential blocks (16 MB each) may be included into a group. Before the grouping, storage controller 152 collects I/O activity data for each 16 MB block. After the grouping, the storage controller collects I/O activity for the 1 GB group, and assigns to each block an average I/O activity based on: (i) the group I/O activity; and (ii) the number of blocks in the group.

Storage controller 152 collects patterns of I/O activity at the group-level. In any storage system, a statistical distribution of I/O activity of the data blocks typically may be found to approximate a normal (Gausian) distribution. Some blocks will have I/O activity below the group mean (designated as “cool” and “cold” blocks), and some will be above the mean (and designated as “warm” and “hot” blocks). Hot blocks are above a pre-defined threshold value, and are significantly above the mean. Field experience in some industries, for example the banking industry, has shown that hot blocks typically comprise approximately 20% (sometimes herein referred to as a “hot ratio”) of all blocks in a storage system, though the 20% figure can vary widely from system to system, depending on many factors.

The dynamic grouping method presently under discussion, further includes the following operations: (i) storage controller 152 calculates a maximum number of sample groups (N) for which I/O learning (I/O activity statistical data collection) can be conducted given system resource limitations; (ii) the storage controller determines the total number of default sized groups (M) that are in the system; and (iii) the storage system calculates a sub-group size needed to accommodate the hot groups within the amount of storage capacity (TB, PB, etc.) available for the hot groups; and (iv) generate skew information to protect against unnecessary data migration. The calculation is expressed as ((N−t×M)/sub-group size), where N and M are given with respect to items (i) and (ii) above, and t is the number of storage tiers in the system. Learning accuracy, also known as the granularity of the I/O activity metrics, is proportional to the sub-group size. That is, as the sub-group size decreases, the granularity of the I/O activity is finer and the learning is more accurate (more closely correlated with individual data blocks).

Re-configure grouping/sub-grouping based on block I/O activity. The dynamic grouping method presently under discussion, will now be further described with reference to Tables 5A, 5B, and 5C respectively of FIGS. 6A, 6B, and 6C. As shown in Tables 5A, 5B and 5C, the example 1 TB volume has a block size of 16 MB. The default group size is 1 GB. Therefore, the volume has 1024 default groups for I/O learning (collection of activity metrics).

Given the previous calculation, storage controller 152 sub-divides (partitions) the top 20% of default groups (the $1^{st}$ and $2^{nd}$ groups shown as rows 520 and 522 of Table 5B) into sub-groups (64 MB each), as shown as the intersection of rows 520, 522 with columns 510, 512 of Table 5B. The storage controller therefore, in addition to monitoring I/O activity of the default groups, monitors the hot blocks included in the smaller sized sub-groups.

In the present example, after the passage of some time, storage controller 152 determines that the $2^{nd}$ group (522) has cooled off and dropped out of the top 20% in terms of I/O activity. The sub-groups (see row 522, columns 510 and 512) are rejoined into the default group as shown in Table 5C. The storage controller generates skew information with respect to the $2^{nd}$ group with a time lease, based on the smaller group I/O pattern, to protect against unnecessary data migration.

Apply skew information (with time lease) to protect against unnecessary migration In some embodiments of the present invention, the unnecessary data migration is avoided as follows: When a "hot" group turns "cold" all its sub groups' states are reclaimed. In the next migration cycle, this group is chosen to do cold migration (the group is demoted from a higher performance tier to a lower performance tier, for example from an SSD tier to an ENT tier). Some of the blocks inside the group can be expected to have more I/O activity (the blocks are hotter) than others. Therefore, only the colder blocks in this group are migrated (demoted), while the blocks still considered to be "hot" remain on the higher performance tier. Once the colder blocks have been demoted to the lower performance tier, the group remaining on the original SSD tier becomes hotter as its average statistics (no longer including the demoted cooler blocks) increases.

In some embodiments of the present invention, a skew function is generated which maps a weighted average to blocks in a group based on the most recent previous sub-group statistics. This weighted average reflects the I/O distribution trends in a period of time. After passage of a pre-determined time interval (a time lease) the weighted average is cleared.

In some embodiments of the present invention, the skew function is an abstraction to apply any suitable mathematics to generate a mapping 'f(x)' that reflects a block's previous states in a sub-group. 'x' can be one or more characteristics related to the blocks that can differentiate hot blocks from cold blocks.

For example:

(1) Given a block size of 16 MB and a default group size of 1 GB, there are 64 blocks in a group.

(2) Assume that at a most recent previous migration cycle, the group is separated into 16 sub-groups, where blocks 0-3 are in the first sub-group and blocks 60-63 are in the last sub-group.

(3) Assume that a 24-hour moving average of IOPS (I/O operations per second) is chosen as 'x' and a relative percentage of the IOPS in a group is calculated for each block as function 'f(x)'.

Assume blocks 0-3 each have 150 IOPS and blocks 60-63 each have 10 TOPS. The total IOPS in the group is 640 TOPS. Therefore, for blocks 0-3, the IOPS represents a weighted average of approximately 23% (150/640) whereas for blocks 60-63, IOPS represents a weighted average of approximately 2% (10/640).

For simplicity, assume all other blocks (blocks 4-59) have 0% weighted average.

(4) At the next migration cycle, if a group is selected as a cold group for demotion (for example, from SSD to ENT), given the weighted average (0%), blocks 4-59 would be chosen.

(5) This weighted average, in some embodiments, is saved as 7-bits (to optimize memory usage) to reflect the percentage (0-100%).

(6) Because there is no sub-group statistics, this weighted average (for the I/O distribution trend) may only be referred to during the period of the time lease, after which the weighted average may become stale and progressively less accurate. The storage manager or an administrator determines the length of the time-lease, as deemed appropriate for the storage system.

Figure 7:
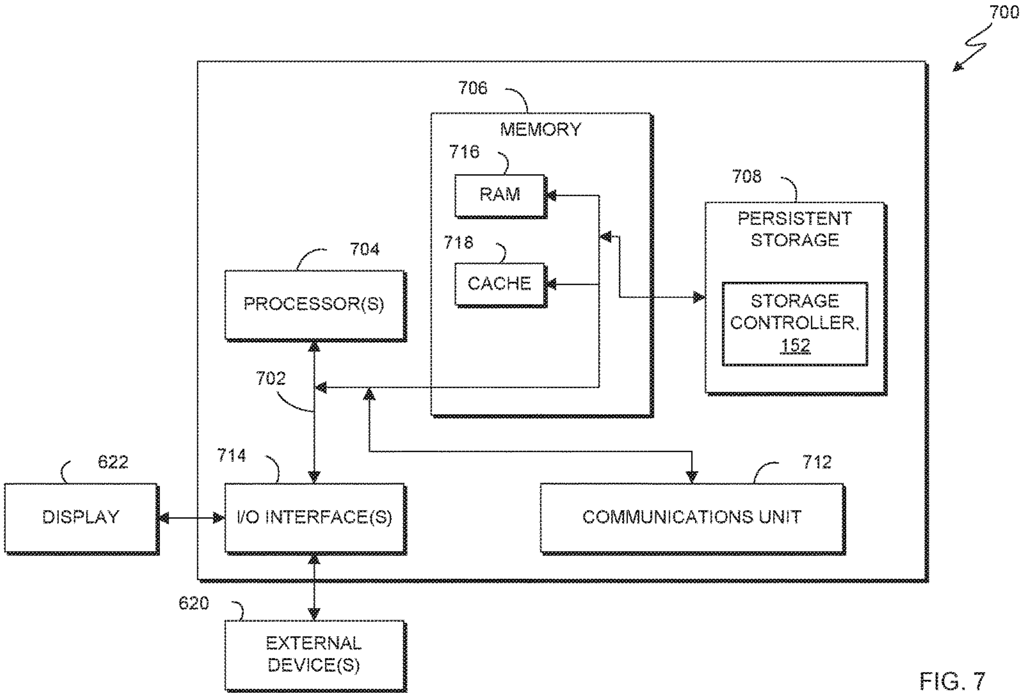
FIG. 7 is a block diagram depicting components of a computer, in accordance with at least one embodiment of the present invention.

FIG. 7 depicts a block diagram of components of computer 700 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

One or more programs may be stored in persistent storage 708 for access and/or execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 708 via I/O interface(s) 714. I/O interface(s) 714 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method comprising:

receiving a first input/output (I/O) statistics dataset with respect to a multi-tier storage system, where the multi-tier storage system comprises: (i) a first storage tier and a second storage tier, (ii) a plurality of data groups including a first data group, wherein the first data group comprises a first data block and the first data block is stored on the first storage tier, wherein (a) the first I/O statistics dataset includes information pertaining to a first activity metric value corresponding to I/O activity with respect to the first data block and (b) the first I/O statistics dataset includes information collected over a first time interval;

determining a first group score with respect to the first data group, where the first group score is based, at least in part, on the first activity metric value;

determining that the first group score is above an upper threshold value;

in response to determining that the first group score is above the upper threshold value, partitioning the first data group into a plurality of data sub-groups including a first data sub-group, where the first data sub-group includes the first data block;

migrating the first data sub-group to the second storage tier;

receiving a second I/O statistics dataset with respect to the multi-tier storage system, wherein (a) the second I/O statistics dataset includes information pertaining to a second activity metric value corresponding to I/O activity with respect to the first data block and (b) the second I/O statistics dataset includes information collected over a second time interval;

determining a second group score with respect to the first data sub-group, where the second group score is based, at least in part, on the second activity metric value;

determining that the second group score does not exceed a lower threshold value;

in response to determining that the second group score does not exceed the lower threshold value, migrating the first data sub-group to the first storage tier; and re-combining the plurality of data sub-groups into a re-combined first data group.

* * * * *